US012584935B2

(12) United States Patent
Kawase et al.

(10) Patent No.: US 12,584,935 B2
(45) Date of Patent: Mar. 24, 2026

(54) ANALYSIS APPLIANCE MANAGEMENT DEVICE

(71) Applicant: SHIMADZU CORPORATION, Kyoto (JP)

(72) Inventors: Tomohiro Kawase, Kyoto (JP); Yugo Hase, Kyoto (JP); Takayuki Nakatani, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 727 days.

(21) Appl. No.: 17/928,527

(22) PCT Filed: Jan. 18, 2021

(86) PCT No.: PCT/JP2021/001524
§ 371 (c)(1),
(2) Date: Jan. 20, 2023

(87) PCT Pub. No.: WO2021/245970
PCT Pub. Date: Dec. 9, 2021

(65) Prior Publication Data
US 2023/0358771 A1     Nov. 9, 2023

(30) Foreign Application Priority Data
Jun. 2, 2020     (JP) ................................. 2020-096512

(51) Int. Cl.
*G01N 35/00*     (2006.01)
*G01N 30/34*     (2006.01)
*G01N 30/88*     (2006.01)
(52) U.S. Cl.
CPC ....... *G01N 35/00732* (2013.01); *G01N 30/34* (2013.01); *G01N 2030/8804* (2013.01); *G01N 2035/0091* (2013.01)

(58) Field of Classification Search
CPC ............. G01N 35/00732; G01N 30/34; G01N 2030/8804; G01N 2035/0091; G01N 30/88; G01N 2035/00891
See application file for complete search history.

(56) References Cited

U.S. PATENT DOCUMENTS

| | | | |
|---|---|---|---|
| 6,315,901 B1 | 11/2001 | Okada | |
| 2012/0109529 A1* | 5/2012 | Ariyoshi | .............. G01N 35/026 702/19 |

(Continued)

FOREIGN PATENT DOCUMENTS

| | | |
|---|---|---|
| JP | 2000-298122 A | 10/2000 |
| JP | 2008051565 A  * | 3/2008 |

(Continued)

OTHER PUBLICATIONS

Office Action in corresponding Chinese Patent Application No. 202180045452.X dated Feb. 22, 2025, with machine translation.

(Continued)

*Primary Examiner* — John McGuirk
(74) *Attorney, Agent, or Firm* — Renner, Otto, Boisselle & Sklar, LLP

(57) ABSTRACT

Identification information for identifying each analysis appliance and consumable information representing a usage state of a consumable included in each analysis appliance are acquired by an information acquirer from a control device. The identification information and the consumable information acquired by the information acquirer are held by an information holder. A display controller causes a display device to display a list screen of identification information held by the information holder. Further, the display controller causes a usage state of a consumable for each analysis appliance to be displayed on the list screen based on consumable information held by the information holder.

11 Claims, 6 Drawing Sheets

(56)                    References Cited

U.S. PATENT DOCUMENTS

2012/0239676  A1      9/2012  Kaneko et al.
2020/0096526  A1*    3/2020  Suter ................ G01N 35/00663

FOREIGN PATENT DOCUMENTS

JP        2008-241386  A      10/2008
JP        2009-036513  A        2/2009
JP        2014-228403  A      12/2014
WO        2011/067888  A1      6/2011

OTHER PUBLICATIONS

First Office Action for corresponding Chinese Application No. 202180045452.X dated Jul. 30, 2024 and its English Machine Translation.
International Search Report for corresponding Application No. PCT/JP2021/001524, mailed Apr. 6, 2021.
Written Opinion for corresponding Application No. PCT/JP2021/001524, mailed Apr. 6, 2021 (English machine translation).

* cited by examiner

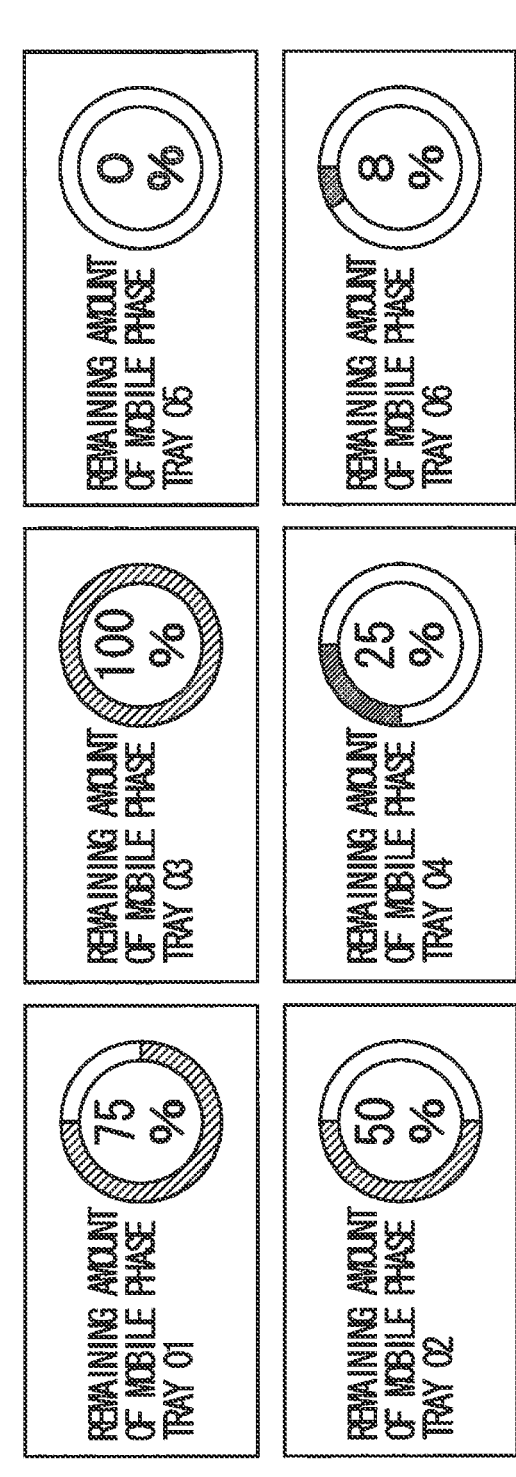
F I G. 4

F I G.  5
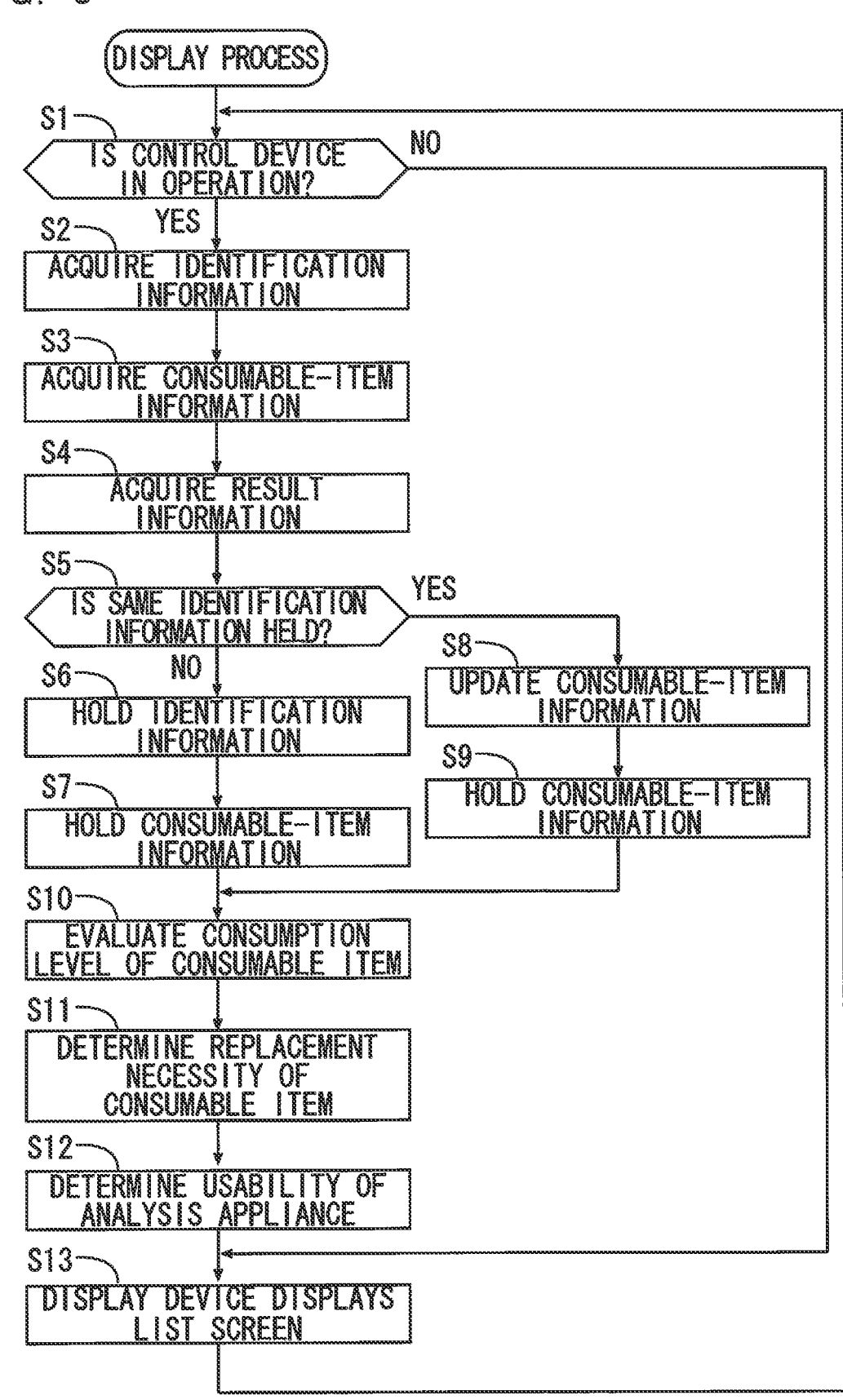

F I G. 6
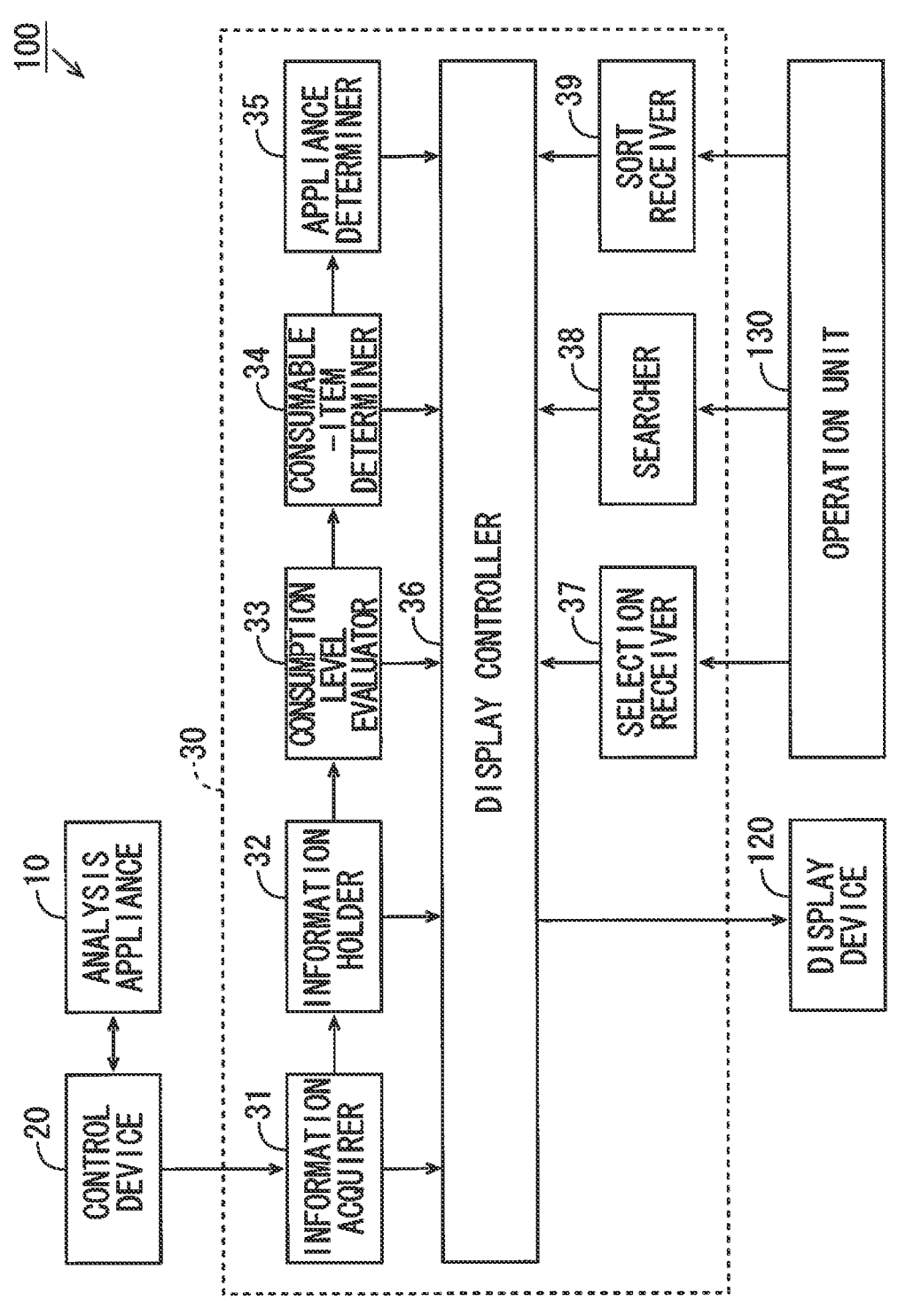

ANALYSIS APPLIANCE MANAGEMENT DEVICE

TECHNICAL FIELD

The present invention relates to an analysis appliance management device.

BACKGROUND ART

A plurality of analysis appliances such as a gas chromatograph, a liquid chromatograph or a mass spectrometer may be provided in a research facility at which an analysis of a sample is performed. Further, in such an analysis system, a management device such as a database management system, a laboratory data management system or a laboratory information management system is provided (see Patent Document 1, for example.) The plurality of analysis appliances are managed by the management device. A user of the analysis system who is a member of the research facility can perform an analysis of a sample by using a desired analysis appliance.

[Patent Document 1] JP 2008-241386 A

SUMMARY OF INVENTION

Technical Problem

In order to appropriately manage each analysis appliance, the user of the analysis system needs to activate unique control software corresponding to each analysis appliance and suitably check the usage state (the remaining amount of a consumable, the period of time in which a consumable is used or the number of times a consumable is used, for example) of a consumable of the analysis appliance. However, it is troublesome to activate the control software of each analysis appliance each time the user checks the usage state of a consumable. Further, the manner in which the state of a consumable is presented by the control software varies depending on the model of an analysis appliance. Therefore, it may not be easy to appropriately check the state of a consumable.

An object of the present invention is to provide an analysis appliance management device that can facilitate management of an analysis appliance.

Solution to Problem

One aspect of the present invention relates to an analysis appliance management device that is used together with control devices of a plurality of different types of analysis appliances that analyze samples and a display device and includes an information acquirer that acquires identification information for identifying each analysis appliance and consumable information representing a usage state of a consumable included in each analysis appliance from the control device, an information holder that holds identification information and consumable information acquired by the information acquirer, and a display controller that causes the display device to display a list screen of identification information held by the information holder and displays a usage state of a consumable for each analysis appliance based on consumable information held by the information holder on the list screen.

Advantageous Effects of Invention

The present invention can facilitate management of an analysis appliance.

BRIEF DESCRIPTION OF THE DRAWINGS

FIG. 4 is a diagram showing one example of a usage state display portion of FIG. 3.

FIG. 5 is a flowchart showing one example of the algorithm of a display process executed by the analysis appliance management device of FIG. 2.

FIG. 6 is a diagram showing the configuration of an analysis appliance management device in a modified example.

DESCRIPTION OF EMBODIMENTS

(1) Configuration of Analysis System

Figure 1:
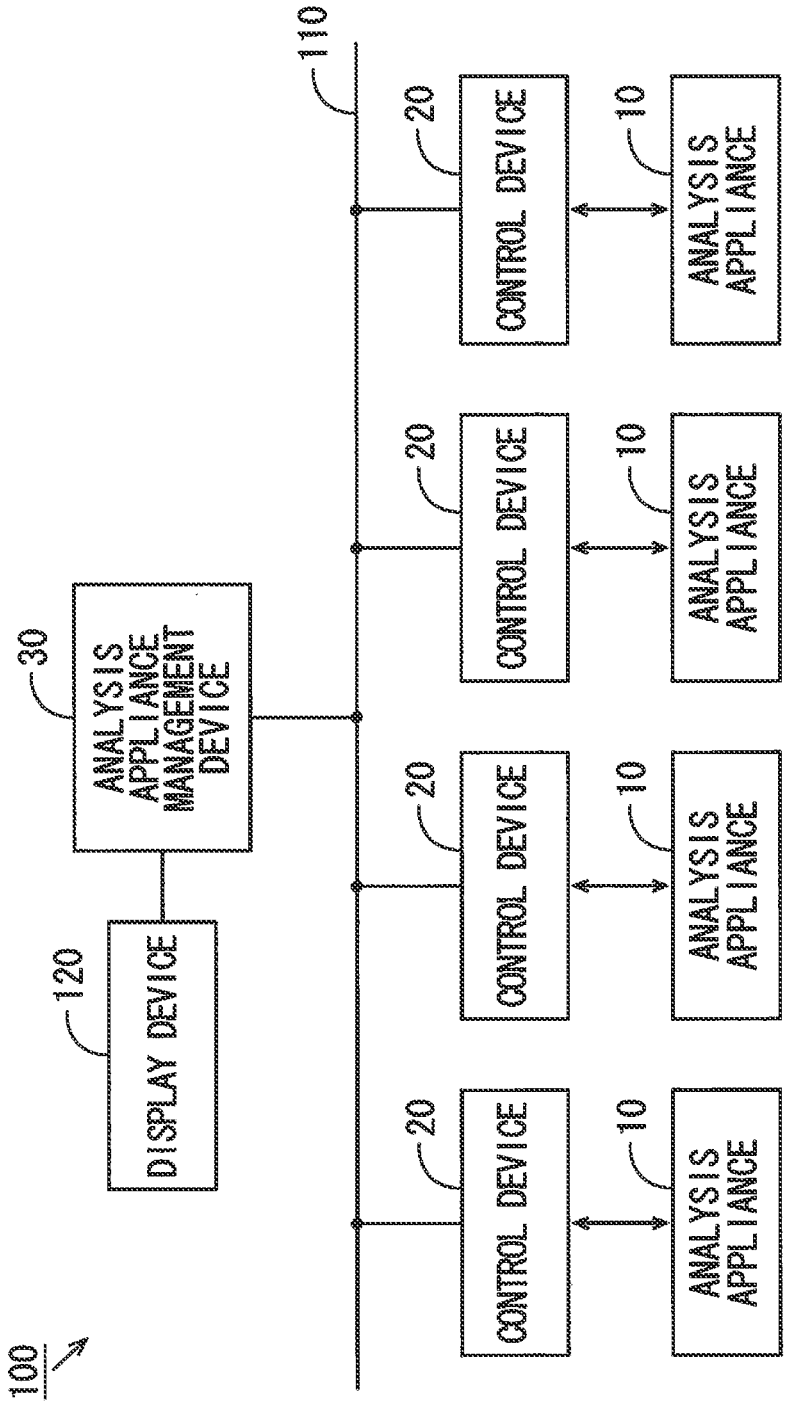
FIG. 1 is a diagram showing the configuration of an analysis system including an analysis appliance management device according to one embodiment of the present invention.

An analysis appliance management device according to embodiments of the present invention will be described below in detail with reference to the drawings. FIG. 1 is a diagram showing the configuration of an analysis system including the analysis appliance management device according to one embodiment of the present invention. As shown in FIG. 1, the analysis system 100 includes a plurality of analysis appliances 10, a plurality of control devices 20 and the analysis appliance management device 30. The plurality of control devices 20 correspond to the plurality of analysis appliances 10, respectively. Each control device 20 and the analysis appliance management device 30 are connected to a network 110 so as to be able to communicate with each other.

The types of the plurality of analysis appliances 10 are different from one another. The types of the analysis appliances 10 may include a liquid chromatograph, a gas chromatograph, a liquid chromatograph mass spectrometer, a gas chromatograph mass spectrometer, an ultraviolet-visible absorptiometer, an infrared spectrophotometer, a spark emission spectrometer or an atomic absorption spectrophotometer, for example. The types of the analysis appliances 10 may also include an inductively coupled plasma mass spectrometer, an inductively coupled plasma emission spectrophotometer, an energy dispersive X-ray analysis device, a wavelength dispersive X-ray analysis device, an atomic force microscope, an electron probe micro analyzer, a particle size distribution measuring device, a microchip electrophoresis device, an autograph, balance or non-destructive inspection equipment, for example.

Each control device 20 is realized by an information processing apparatus such as a personal computer and includes a CPU (Central Processing Unit) and a memory. Unique control software is installed in each control device 20. Each control device 20 is activated when the corresponding analysis appliance 10 is running, controls the operation of the analysis appliance 10 based on the installed control software and records the usage state of a consumable of the analysis appliance 10.

In a case in which an analysis appliance 10 is a liquid chromatograph, the usage states of consumables include the amount of a used mobile phase, the period of time in which a pump is used, the period of time in which a lamp is used and the number of times a needle is used, for example. In a case in which an analysis appliance 10 is a gas chromatograph, the usage state of a consumable includes the number of times a septum is used or the number of times an insert is used, for example. In a case in which an analysis appliance 10 is a mass spectrometer, the usage state of a consumable includes the period of time in which a rotary pump is used, for example. The usage state of a consumable may include the remaining amount of the consumable, the remaining period of time in which the consumable can be used or the remaining number of times the consumable can be used instead of the period of time in which the consumable is used or the remaining number of times the consumable is used, described above.

The analysis appliance management device 30 is realized by an information processing device such as a personal computer, includes a CPU and a memory, and can be connected to the display device 120. The display device 120 is constituted by a liquid crystal display panel or an organic EL (Electroluminescence) panel, for example. The analysis appliance management device 30 causes the display device 120 to display identification information for identifying an analysis appliance 10 and a list screen showing the usage state of a consumable for each analysis appliance 10. Details of the analysis appliance management device 30 will be described below.

(2) Analysis Appliance Management Device

Figure 2:
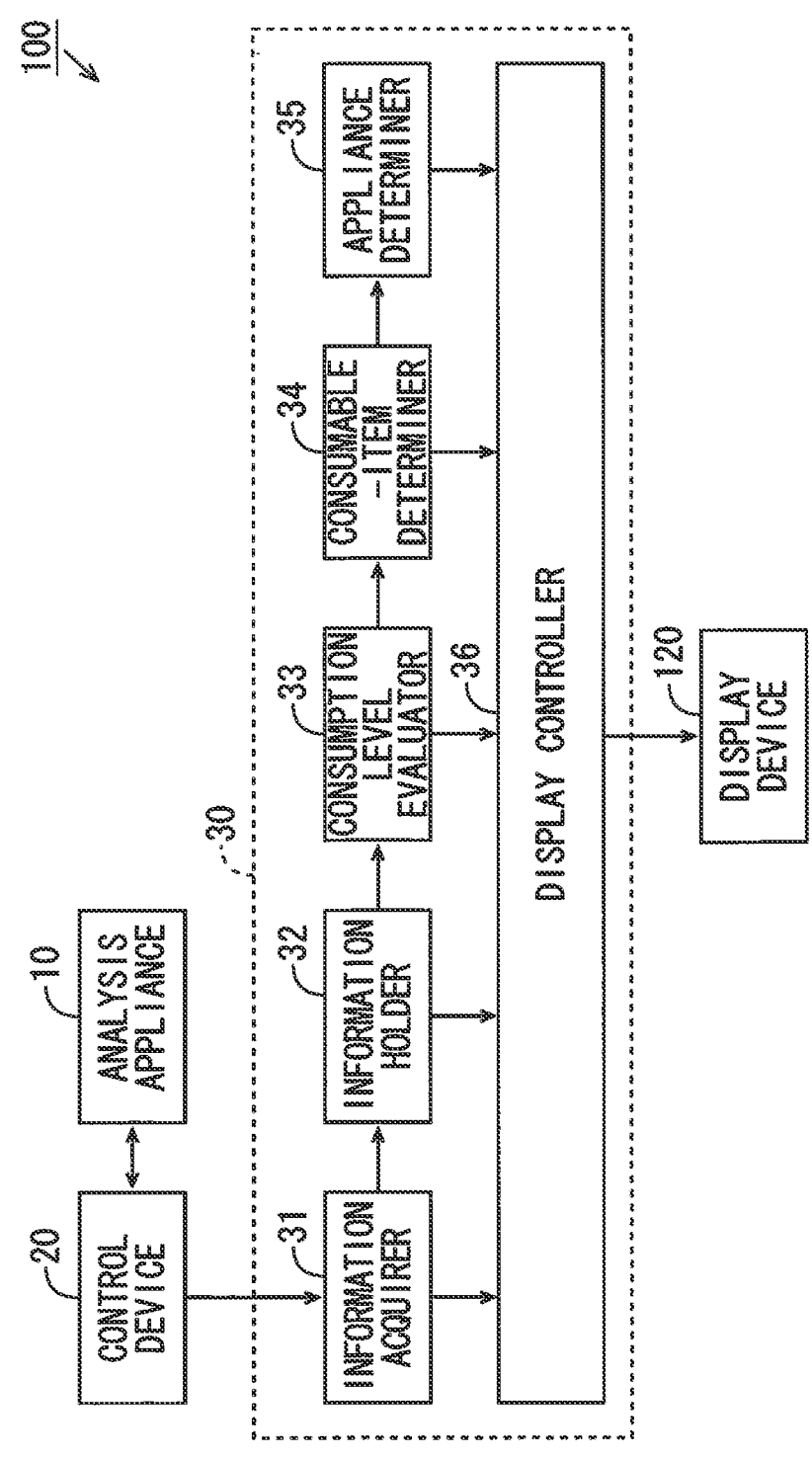
FIG. 2 is a diagram showing the configuration of the analysis appliance management device.

FIG. 2 is a diagram showing the configuration of the analysis appliance management device 30. As shown in FIG. 2, the analysis appliance management device includes an information acquirer 31, an information holder 32, a consumption level evaluator 33, a consumable determiner 34, an appliance determiner 35 and a display controller 36. The functions of the analysis appliance management device 30 are implemented when the CPU of the analysis appliance management device 30 executes a control program stored in the memory. Part or all of the functions of the analysis appliance management device 30 may be implemented by hardware such as an electronic circuit.

When any one of the control devices 20 is in operation, the information acquirer 31 acquires identification information of the corresponding analysis appliance 10 from the control device 20 and regularly acquires consumable information representing the usage state of a consumable of the analysis appliance 10. Further, the information acquirer 31 regularly acquires result information representing a result of analysis performed by the corresponding analysis appliance 10 from the control device 20 in operation.

The information holder 32 holds the identification information and the consumable information acquired by the information acquirer 31 even after the control device 20 is powered off (i.e., shut down). In a case in which the same control device 20 as a control device 20 that has been previously in operation is in operation again, the information holder 32 updates consumable information, which the information holder 32 already holds, with consumable information newly acquired by the information acquirer 31. Whether the same control device 20 is in operation is determined based on identification information.

The consumption level evaluator 33 evaluates the consumption level of each consumable held by the information holder 32. In the present example, the higher a consumption level is, the littler a consumable is consumed. Specifically, in a case in which a consumable is a mobile phase or the like, the consumption level of the consumable is a remaining amount with respect to a maximum storage amount. In a case in which a consumable is a pump, a lamp or the like, the consumption level of the consumable is the remaining period of time in which the consumable can be used with respect to the maximum period of time in which the consumable can be used. In a case in which a consumable is a needle, a septum, an insert or the like, the consumption level of the consumable is the remaining number of times the consumable can be used with respect to the maximum number of times the consumable can be used.

The consumable determiner 34 determines replacement necessity of each consumable based on a consumption level evaluated by the consumption level evaluator 33. In the present example, first and second threshold values are defined in advance in regard to the consumption level of each consumable. The second threshold value is smaller than the first threshold value. A consumable the consumption level of which is larger than the first threshold value is determined as "a consumable that does not need to be replaced." A consumable the consumption level of which is equal to or smaller than the first threshold value and larger than the second threshold value is determined as "a consumable that needs to be replaced soon." A consumable the consumption level of which is equal to or smaller than the second threshold value is determined as "a consumable that needs to be replaced."

The appliance determiner 35 determines replacement necessity of each analysis appliance 10 based on a result of determination made by the consumable determiner 34. In the present example, an analysis appliance 10 all of the consumables of which are determined as "a consumable that does not need to be replaced" is determined as "an appliance having no consumable that needs to be replaced." An analysis appliance 10 which does not have any consumable that is determined as "a consumable that needs to be replaced" and has at least part of consumables that is determined as "a consumable that needs to be replaced soon" is determined as "an appliance having a consumable that needs to be replaced soon." An analysis appliance 10 at least part of consumables of which is determined as "a consumable that needs to be replaced" is determined as "an appliance having a consumable that needs to be replaced."

The display controller 36 causes the display device 120 to display a list screen of identification information held by the information holder 32. Further, the display controller 36 causes the consumption level of a consumable for each analysis appliance 10 to be displayed on the above-mentioned list screen based on consumable information held by the information holder 32 and a result of evaluation made by the consumption-level evaluator 33 such that the consumption level of a consumable corresponds to the identification information of the analysis appliance 10. Further, the display controller 36 further causes a result of determination made by the consumable determiner 34 to be displayed on the list screen as replacement necessity information, and the display controller 36 further causes a result of determination made by the appliance determiner 35 to be displayed on the list screen as usability information.

In a case in which result information is acquired by the information acquirer 31, the display controller 36 causes a result of analysis to be displayed on the list screen based on the acquired result information such that the result of analysis corresponds to the identification information of an analysis appliance 10. A result of analysis includes a liquid chromatogram, a gas chromatogram or a mass spectrum, for example. Further, in a case in which the analysis appliance 10 is a liquid chromatograph, consumable information further includes the type of a mobile phase. In this case, the display controller 36 causes the type of a mobile phase to be displayed on the list screen based on the consumable information held by the information holder 32.

(3) List Screen

Figure 3:
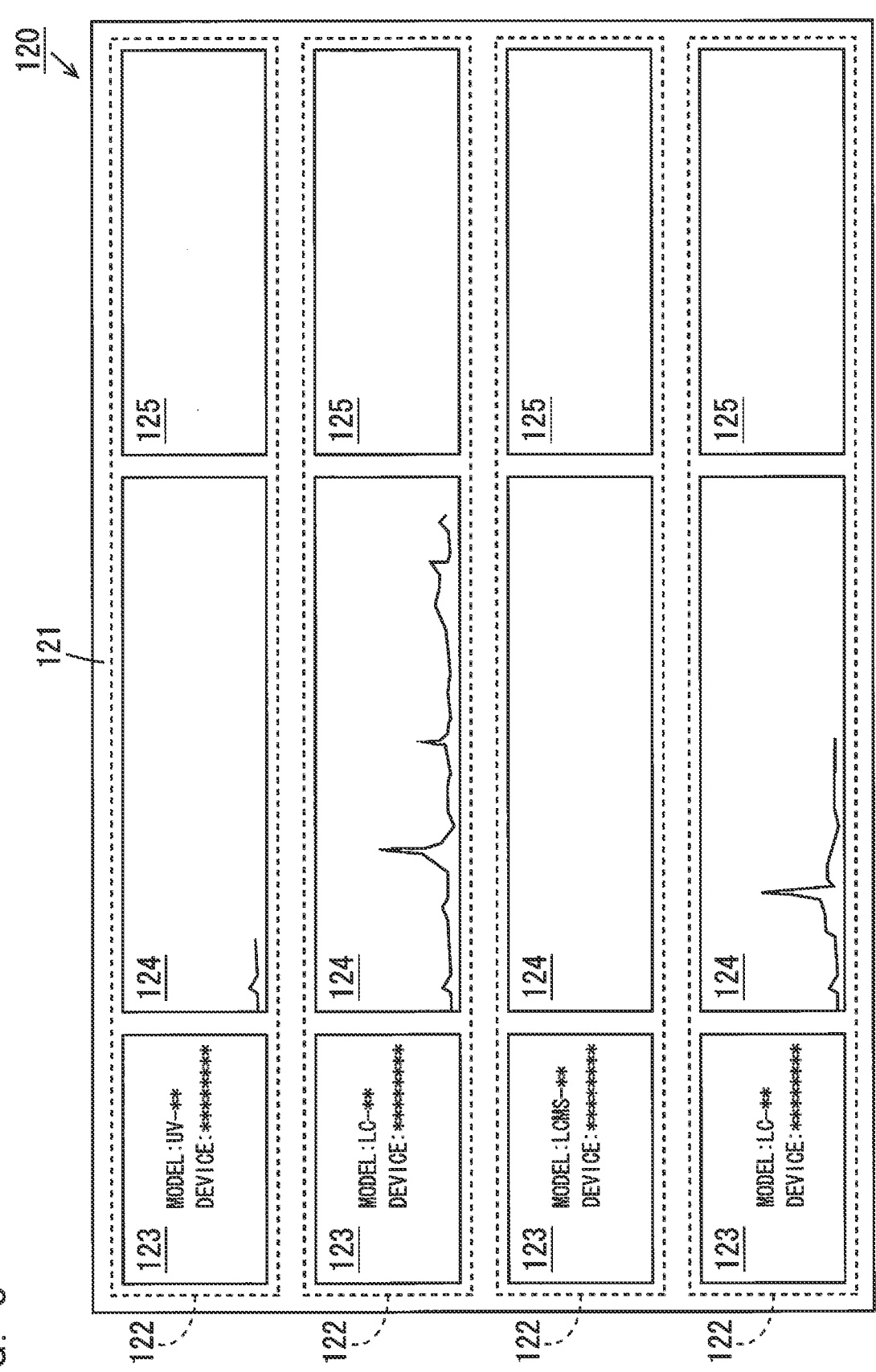
FIG. 3 is a diagram showing one example of a list screen displayed by a display device.

FIG. 3 is a diagram showing one example of a list screen displayed by the display device 120. As shown in FIG. 3, on the list screen 121, a plurality of display areas 122 respectively corresponding to the plurality of analysis appliances 10 (FIG. 1) are arranged so as to be aligned in an up-and-down direction, for example. In each display area 122, an identification information display portion 123, an analysis result display portion 124 and a usage state display portion 125 are arranged to be aligned in this order from the left to the right, for example. The order in which the identification information display portion 123, the analysis result display portion 124 and the usage state display portion 125 are arranged is not limited to the present example.

In the identification information display portion 123, the identification information of a corresponding analysis appliance 10 is displayed. Identification information may include a model name, a device name or the like of an analysis appliance 10 or may include a thumbnail image of the analysis appliance 10. Further, in the identification information display portion 123, usability information is displayed based on a result of determination made by the appliance determiner 35 of FIG. 2. In the present example, blue, yellow and red indicators are respectively displayed as usability information in the identification information display portions 123 corresponding to analysis appliances 10 which are determined as "an appliance having no consumable that needs to be replaced," "an appliance having a consumable that needs to be replaced soon" and "an appliance having a consumable that needs to be replaced." Usability information may be displayed with combination of indicators in other colors.

A method of displaying usability information is not limited to the above-mentioned example. For example, usability information does not have to be displayed in the identification information display portion 123 corresponding to the analysis appliance 10 determined as "an appliance having no consumable that needs to be replaced" or "an appliance having a consumable that needs to be replaced soon," for example. In this case, usability information is displayed in the identification information display portion 123 corresponding to the analysis appliance 10 determined as "an appliance having a consumable that needs to be replaced."

Alternatively, usability information does not have to be displayed in the identification information display portion 123 corresponding to the analysis appliance 10 determined as "an appliance having no consumable that needs to be replaced." In this case, usability information is displayed in the identification information display portion 123 corresponding to the analysis appliance 10 determined as "an appliance having a consumable that needs to be replaced soon" or "an appliance having a consumable that needs to be replaced." Further, usability information may be displayed with not use of indicators in color but a character string or an indicator such as "!" representing the content of the usability information.

In an analysis result display portion 124, a result of analysis performed by an analysis appliance 10 is displayed in real time while being updated during running of the corresponding analysis appliance 10. In at least one of an identification information display portion 123 and an analysis result display portion 124, whether the operation state of a corresponding analysis appliance 10 is "running" or "ready" may be displayed.

In a usage state display section 125, the usage state of a consumable of the corresponding analysis appliance 10 is displayed. In a case in which an analysis appliance is a liquid chromatograph, the type of a mobile phase may further be displayed in the usage state display section 125 corresponding to the analysis appliance 10. FIG. 4 is a diagram showing one example of a usage state display section 125 of FIG. 3. In the example of FIG. 4, in regard to mobile phases in first to sixth bottles held on a tray, consumption levels evaluated by the consumption level evaluator 33 of FIG. 2 are displayed.

Specifically, the consumption levels of the mobile phases in the first to sixth bottles are 75%, 50%, 100%, 25%, 0% and 8%, respectively. These consumption levels are not only displayed numerically but also displayed visually with marking in the pie charts. A user can easily identify the rough estimate of a period until replacement of each consumable (a mobile phase in the present example) by viewing a numerical value indicating a consumption level or marking in a pie chart.

Further, in a usage state display portion 125, replacement necessity information is displayed based on a result of determination made by the consumable determiner 34 of FIG. 2. In the present example, the mobile phases in the first to third bottles are determined as "a consumable that does not need to be replaced," and the markings in the pie charts indicating the consumption levels are displayed in blue. The mobile phases in the fourth and sixth bottles are determined as "a consumable that needs to be replaced soon," and the markings in the pie charts indicating the consumption levels are displayed in yellow. The mobile phase in the fifth bottle is determined as "a consumable that needs to be replaced," and the numerical value indicating the consumption level is displayed in red. A result of determination may be displayed with combination of other colors. In FIG. 4, a difference in color is indicated by a difference in hatching pattern.

A method of displaying replacement necessity information is not limited to the above-mentioned example. For example, in regard to a consumable determined as "a consumable that does not need to be replaced" or "a consumable that needs to be replaced soon," replacement necessity information does not have to be displayed in a usage state display portion 125. In this case, in regard to a consumable determined as "a consumable that needs to be replaced," replacement necessity information is displayed in a usage state display section 125.

Alternatively, in regard to a consumable determined as "a consumable that does not need to be replaced," replacement necessity information does not have to be displayed in a usage state display section 125. In this case, in regard to a consumable determined as "a consumable that needs to be replaced soon" or "a consumable that needs to be replaced," replacement necessity information is displayed in a usage state display portion 125. Further, replacement necessity information may be displayed with not use of color but with use of a character string or an indicator such as "!" representing the content of the replacement necessity information.

(4) Display Process

FIG. 5 is a flowchart showing one example of the algorithm of a display process executed by the analysis appliance management device 30 of FIG. 2. The information acquirer 31 determines whether any of the control devices 20 of the analysis system 100 is in operation (step S1). In a case in which none of the control devices 20 is in operation, the information acquirer 31 proceeds to the step S13.

In a case in which any of the control devices 20 is in operation, the information acquirer 31 acquires the identification information of the corresponding analysis appliance from the control device 20 (step S2). Further, the information acquirer 31 acquires the consumable information of the corresponding analysis appliance 10 from the control device (step S3). Further, the information acquirer 31 acquires the result information provided by the corresponding analysis appliance 10 from the control device 20 (step S4). Either one of the steps S2 to S4 may be executed first, or the steps S2 to S4 may be executed at the same time.

Next, the information holder 32 determines whether the same identification information as the identification information acquired in the step S2 is held (step S5). In a case in which the same identification information is not held, the information holder 32 holds the identification information acquired in the step S2 (step S6). Further, the information holder 32 holds the consumable information acquired in the step S3 (step S7).

In a case in which the same identification information is held in the step S5, the information holder 32 updates the consumable information held in the step S7 with the consumable information acquired in the step S3 (step S8). Further, the information holder 32 holds the consumable information updated in the step S8 (step S9).

Subsequently, the consumption level evaluator 33 evaluates the consumption level of a consumable based on the consumable information held in the step S7 or the step S9 (step S10). The consumable determiner 34 determines replacement necessity of the consumable based on the consumption level of the consumable evaluated in the step S10 (step S11). The appliance determiner 35 determines usability of the analysis appliance 10 based on the result of determination in regard to the consumable in the step S11 (step S12).

The display controller 36 causes the display device 120 to display the list screen 121 based on the result information acquired in the step S4, the identification information held in the step S6, the consumable information held in the steps S7 and S9, the consumption level evaluated in the step S10 and a result of determination made in the steps S11 and S12 (step S13). Thereafter, the display controller 36 returns to the step S1.

(5) Effects

In the analysis appliance management device 30 according to the present embodiment, the identification information for identifying an analysis appliance 10 and the consumable information representing the usage state of a consumable included in the analysis appliance 10 are acquired by the information acquirer 31 from the control device 20. The identification information and the consumable information acquired by the information acquirer 31 are held by the information holder 32. The display controller 36 causes the display device 120 to display the list screen 121 of the identification information held by the information holder 32. Further, the display controller 36 causes the usage state of a consumable for each analysis appliance 10 to be displayed on the list screen 121 based on the consumable information held by the information holder 32.

With this configuration, the identification information and the consumable information acquired by the information acquirer 31 are held by the information holder 32 even after the control device 20 is powered off. Thus, even in a case in which the control device 20 is not in operation, the list screen 121 can be displayed by the display device 120 based on the identification information and the consumable information held by the information holder 32. Therefore, it is not necessary for the user to operate the control device 20 of the analysis appliance 10 in order to view the list screen 121.

Further, in the list screen 121, the plurality of display areas 122 respectively corresponding to the plurality of different types of analysis appliances 10 are arranged. In each of the plurality of display areas 122, the identification information display portion 123 for displaying the identification information of a corresponding analysis appliance 10 and the usage state display portion 125 for displaying the usage state of a consumable included in the corresponding analysis appliance 10 are arranged.

In this manner, because the identification information of the plurality of different types of analysis appliances 10 and the usage state of a consumable for each analysis appliance 10 are displayed in a highly browsable manner, the user is unlikely to miss information. Therefore, the user can check the usage state of a consumable in each analysis appliance 10 at once by viewing the list screen 121. As a result, the user can easily manage the analysis appliances 10.

Specifically, a person in charge of maintenance of the analysis system 100 can replace a consumable at an appropriate time while checking the usage state of a consumable in each analysis appliance 10. The person in charge of the analysis system 100 can designate which analysis appliance 10 is to be used by a person who performs a predetermined analysis by identifying the usage state of a consumable of each analysis appliance 10.

Further, a plurality of analytical appliances 10 such as a pre-processor and a mass spectrometer may be continuously used to analyze a single sample. In such a case, a person who performs an analysis can schedule the use of the plurality of analysis appliances 10 and secure an analysis appliance 10 required for an analysis by identifying the usage state of each analysis appliance 10. Therefore, there is no case in which an analysis cannot be continued due to depletion of a consumable in any one of the analysis appliances 10. This can prevent a sample from being wastefully discarded.

In an identification information display portion 123 of the list screen 121, a result of determination made by the appliance determiner 35 is further displayed as usability information of an analysis appliance 10. The usability information includes the information representing that there is no consumable that needs to be replaced, the information representing that there is a consumable that needs to be replaced and the information representing that there is a consumable that needs to be replaced soon. Therefore, the user can easily identify the usability of each analysis appliance 10 in detail by viewing the identification information display portion 123.

In a usage state display portion 125 of the list screen 121, a result of the determination made by the consumable determiner 34 is further displayed as replacement necessity information of a consumable. Here, the replacement necessity information includes the information representing that a consumable does not need to be replaced, the information representing that a consumable needs to be replaced and the information representing that a consumable needs to be replaced soon. Therefore, the user can easily identify the replacement necessity of each consumable in detail by viewing the usage state display portion 125.

(6) Modified Example

FIG. 6 is a diagram showing the configuration of an analysis appliance management device 30 in a modified example. As shown in FIG. 6, an operation unit 130 can be connected to the analysis appliance management device 30. The operation unit 130 includes a pointing device such as a mouse or a keyboard and is operated by a user.

The analysis appliance management device 30 further includes a selection receiver 37, a searcher 38 and a sort receiver 39 as functions. The functions of the analysis appliance management device 30 are implemented when the CPU of the analysis appliance management device 30 executes a control program stored in the memory. Part or all of the functions of the analysis appliance management device 30 may be implemented by hardware such as an electronic circuit.

The selection receiver 37 receives selection of a consumable the usage state of which is to be displayed from the operation unit 130. The user can select a desired consumable by operating the operation unit 130. A display controller 36 causes the usage state of a consumable the selection of which is received by the selection receiver 37 to be displayed in a usage state display portion 125 of FIG. 3. With this configuration, even in a case in which the display screen of a display device 120 is small, the usage state of the consumable selected by the user can be displayed in a large size. Therefore, the user can easily view the usage state of the desired consumable.

The searcher 38 receives the input of a search condition of a consumable from the operation unit 130. The search condition includes the usage state or the type of a consumable, for example. The user can input a desired search condition by operating the operation unit 130. In a case in which receiving the input of a search condition, the searcher 38 searches for the analysis appliance 10 including a consumable satisfying the received search condition. The display controller 36 causes the display area 122 (FIG. 3) corresponding to the analysis appliance 10 searched by the searcher 38 to be displayed on the list screen 121. In the displayed display area 122, an identification information display portion 123, an analysis result display portion 124 and a usage state display portion 125 are displayed.

Therefore, the user can easily identify an analysis appliance 10 including a consumable of a desired usage state or type. For example, the user can easily identify a liquid chromatograph including a mobile phase with a small remaining amount or a lamp with a short remaining usable period of time. Alternatively, the user can easily identify a liquid chromatograph including a particular type of mobile phase.

The sort receiver 39 receives a sort instruction from the operation unit 130. The user can provide the sort instruction by operating the operation unit 130. In a case in which the operation unit 130 receives the sort command, the display controller 36 changes the arrangement order of a plurality of display areas 122 displayed on the list screen 121 in accordance with the consumption level of any of consumables included in an analysis appliance 10. Each time the sort receiver 39 receives a sort instruction, the arrangement order of the plurality of display areas 122 may be switched between the ascending order and the descending order of the consumption levels of consumables. The user can easily identify an analysis appliance 10 including a consumable the consumption level of which is high or a consumable the consumption level of which is low by providing a sort instruction.

(7) Other Embodiments (a) While each control device 20 is a device separate from the corresponding analysis appliance 10 in the above-mentioned embodiment, the embodiment is not limited to this. Each of part or all of the control devices 20 may constitute one analysis device together with the corresponding analysis appliance 10. In this case, the analysis appliance management device 30 acquires identification information, consumable information or result information from the control device 20 of an analysis appliance in operation.

(b) While the usability of each analysis appliance 10 is evaluated to be in one of the three levels of "an appliance having no consumable that needs to be replaced," "an appliance having a consumable that needs to be replaced soon" and "an appliance having a consumable that needs to be replaced" in the above-mentioned embodiment, the embodiment is not limited to this. The usability of each analysis appliance 10 may be evaluated to be in one of the two levels of "an appliance having no consumable that needs to be replaced" and "an appliance having a consumable that needs to be replaced." Alternatively, the usability of each analysis appliance 10 does not have to be determined. In this case, the analysis appliance management device 30 does not include the appliance determiner 35. Further, the step S12 in the display process is not executed.

(c) While the replacement necessity of each consumable is evaluated to be in one of the three levels of "a consumable that does not need to be replaced," "a consumable that needs to be replaced soon" and "a consumable that needs to be replaced," the embodiment is not limited to this. The replacement necessity of each consumable may be evaluated to be in one of the two levels of "a consumable that does not need to be replaced" and "a consumable that needs to be replaced." Alternatively, the replacement necessity of each consumable does not have to be determined. In this case, the analysis appliance management device 30 does not include the consumable determiner 34. Further, the step S11 in the display process is not executed.

(d) While the consumption level of a consumable is displayed in a usage state display portion 125 as the usage state of the consumable in the above-mentioned embodiment, the embodiment is not limited to this. Instead of the consumption level of a consumable, the remaining amount, the remaining period of time the consumable can be used or the remaining number of times the consumable can be used may be displayed in a usage state display portion 125 as the usage state of the consumable. In this case, the analysis appliance management device 30 does not include the consumption level evaluator 33. Further, the step S10 in the display process is not executed.

(e) While the analysis appliance management device 30 includes all of the selection receiver 37, the searcher 38 and the sort receiver 39 in the modified example of the above-mentioned embodiment, the embodiment is not limited to this. The analysis appliance management device 30 does not have to include part of the selection receiver 37, the searcher 38 or the sort receiver 39.

(8) Aspects

It is understood by those skilled in the art that the plurality of above-mentioned illustrative embodiments are specific examples of the below-mentioned aspects.

(Item 1) An analysis appliance management device according to one aspect may be used together with control devices of a plurality of different types of analysis appliances that analyze samples and a display device, and may include an information acquirer that acquires identification information for identifying each analysis appliance and consumable information representing a usage state of a consumable included in each analysis appliance from the control device, an information holder that holds identification information and consumable information acquired by the information acquirer, and a display controller that causes the display device to display a list screen of identification information held by the information holder and displays a usage state of a consumable for each analysis appliance based on consumable information held by the information holder on the list screen.

With this configuration, it is possible to check the consumable information of the plurality of different types of analysis appliances (a liquid chromatograph or a gas chromatograph, for example) on the common list screen at once. Further, the identification information and the consumable information acquired by the information acquirer are held by the information holder even after a control device is powered off. Thus, even in a case in which the control device is not in operation, the list screen can be displayed by the display device based on the identification information and the consumable information held by the information holder. Therefore, it is not necessary for a user to operate the control device of the analysis appliance in order to view the list screen.

(Item 2) The analysis appliance management device according to item 1, wherein a plurality of display areas respectively corresponding to the plurality of different types of analysis appliances may be arranged on the list screen, and in each of the plurality of display areas, an identification information display portion for displaying identification information of a corresponding analysis appliance and a usage state display portion for displaying a usage state of a consumable included in a corresponding analysis appliance may be arranged.

In this case, on the list screen, the identification information of the plurality of different types of analysis appliances and the usage state of a consumable for each analysis appliance are displayed in a highly browsable manner. Therefore, the user is unlikely to miss information. Thus, the user can more easily manage the analysis appliances.

(Item 3) The analysis appliance management device according to item 1 or 2, may further include a consumption level evaluator that evaluates a consumption level indicating a level of consumption of a consumable based on consumable information held by the information holder, wherein the display controller may cause a consumption level evaluated by the consumption level evaluator to be displayed on the list screen as a usage state of a consumable.

In this case, the user can easily identify the rough estimate of a period until replacement of a consumable by viewing a consumption level displayed on the list screen.

(Item 4) The analysis appliance management device according to item 3, may further include a consumable determiner that determines replacement necessity of a consumable based on a consumption level evaluated by the consumption level evaluator, wherein the display controller may further cause a result of determination made by the consumable determiner to be displayed on the list screen as replacement necessity information.

In this case, the user can easily identify the replacement necessity of a consumable by viewing the list screen.

(Item 5) The analysis appliance management device according to item 4, may further include an appliance determiner that determines usability of each of the plurality of different types of analysis appliances based on a result of determination made by the consumable determiner, wherein the display controller may further cause a result of determination made by the appliance determiner to be displayed on the list screen as usability information.

In this case, the user can easily identify the usability of an analysis appliance by viewing the list screen.

(Item 6) The analysis appliance management device according to any one of items 1 to 5, wherein the information acquirer may acquire result information representing a result of analysis performed by an analysis appliance from the control device, and the display controller may cause a result of analysis to be displayed on the list screen based on result information acquired by the information acquirer such that the result of analysis corresponds to identification information of the analysis appliance.

In this case, the user can check a result of analysis performed by an analysis appliance.

(Item 7) The analysis appliance management device according to any one of items 1 to 6, may further include a selection receiver that receives selection of a consumable to be displayed, wherein the display controller may cause the display device to display a usage state of a consumable selection of which has been received by the selection receiver.

With this configuration, even in a case in which the display screen of the display device is small, it is possible to display the usage state of a consumable the selection of which has been received in a large size. Therefore, the user can easily view the usage state of the desired consumable.

(Item 8) The analysis appliance management device according to any one of items 1 to 7, may further include a searcher that receives input of a search condition of a consumable and searches for an analysis appliance including a consumable satisfying a received search condition, wherein the display controller may cause the display device to display identification information and a usage state of a consumable corresponding to an analysis appliance searched by the searcher.

In this case, the user can easily identify the analysis appliance including the consumable satisfying a desired search condition.

(Item 9) The analysis appliance management device according to any one of items 1 to 8, may further include a sort receiver that receives a sort instruction, wherein the display controller may change an arrangement order of sets of identification information and a usage state of a consumable corresponding to the identification information displayed on the list screen in accordance with a usage state of a consumable in a case in which a sort instruction is received by the sort receiver.

In this case, on the list screen, the sets of the identification information and the usage state of a consumable can be rearranged in the order in accordance with the usage states of the consumables. Therefore, the user can more easily and appropriately manage the plurality of different types of analysis appliances.

(Item 10) The analysis appliance management device according to any one of items 1 to 9, wherein any one of the plurality of different types of analysis appliances may include a liquid chromatograph, consumable information corresponding to the analysis appliance may include a type of a mobile phase, and the display controller may cause a type of a mobile phase to be displayed on the list screen based on consumable information held by the information holder such that the type of a mobile phase corresponds to identification information of the analysis appliance.

In this case, the user can easily identify the type of a mobile phase included in the liquid chromatograph by viewing the list screen.

The invention claimed is:

1. An analysis appliance management device that is used together with control devices of a plurality of different types of analysis appliances that analyze samples and a display device, comprising a computer processor that:

acquires identification information for identifying each analysis appliance and consumable information representing a usage state of a consumable included in each analysis appliance from the control device;

holds the acquired identification information and consumable information; and causes the display device to display a common list screen showing the held identification information and the usage state of the consumable for each analysis appliance based on the held consumable information, wherein the computer processor causes identification information of the plurality of different types of analysis appliances and usage states of consumables of the plurality of different types of analysis appliances that correspond to each other to be simultaneously displayed on the list screen.

2. The analysis appliance management device according to claim 1, wherein a plurality of display areas respectively corresponding to the plurality of different types of analysis appliances are arranged on the list screen, and in each of the plurality of display areas, an identification information display portion for displaying identification information of a corresponding analysis appliance and a usage state display portion for displaying a usage state of a consumable included in a corresponding analysis appliance are arranged.

3. The analysis appliance management device according to claim 1, wherein the computer processor further evaluates a consumption level indicating a level of consumption of a consumable based on the held consumable information, and causes the evaluated consumption level to be displayed on the list screen as a usage state of a consumable.

4. The analysis appliance management device according to claim 3, wherein the computer processor further determines replacement necessity of a consumable based on the evaluated consumption level, and further causes a result of the determination as to the replacement necessity of the consumable to be displayed on the list screen as replacement necessity information.

5. The analysis appliance management device according to claim 4, wherein the computer processor further determines usability of each of the plurality of different types of analysis appliances based on the result of the determination as to the replacement necessity of the consumable, and further causes a result of the determination as to the usability of each analysis appliance to be displayed on the list screen as usability information.

6. The analysis appliance management device according to claim 1, wherein the computer processor acquires result information representing a result of analysis performed by an analysis appliance from the control device, and causes a result of analysis to be displayed on the list screen based on the acquired result information such that the result of analysis corresponds to identification information of the analysis appliance.

7. The analysis appliance management device according to claim 1, wherein the computer processor further receives selection of a consumable to be displayed, and causes the display device to display a usage state of a consumable, the selection of which has been received.

8. The analysis appliance management device according to claim 1, wherein the computer processor further receives input of a search condition of a consumable and searches for an analysis appliance including a consumable satisfying the received search condition, and causes the display device to display identification information and a usage state of a consumable corresponding to the searched analysis appliance.

9. The analysis appliance management device according to claim 1, wherein the computer processor further receives a sort instruction, and changes an arrangement order of sets of identification information and a usage state of a consumable corresponding to the identification information displayed on the list screen in accordance with a usage state of a consumable in a case in which the sort instruction is received.

10. The analysis appliance management device according to claim 1, wherein any one of the plurality of different types of analysis appliances includes a liquid chromatograph, consumable information corresponding to the analysis appliance includes a type of a mobile phase, and the computer processor causes a type of a mobile phase to be displayed on the list screen based on the held consumable information such that the type of the mobile phase corresponds to identification information of the analysis appliance.

11. An analysis appliance management device that is used together with control devices of a plurality of different types of analysis appliances that analyze samples and a display device, comprising a computer processor that:

acquires identification information for identifying each analysis appliance and a result of analysis performed by each analysis appliance from the control device;

holds the acquired identification information and the acquired result of analysis; and causes the display device to display a common list screen showing the held identification information and the held result of analysis, wherein the computer processor causes identification information of the plurality of different types of analysis appliances and results of analysis performed by the plurality of different types of analysis appliances that correspond to each other to be simultaneously displayed on the list screen.

\* \* \* \* \*